United States Patent [19]

Ito

[11] Patent Number: 4,673,357
[45] Date of Patent: Jun. 16, 1987

[54] TEACHING MACHINE
[75] Inventor: Takamasa Ito, Tokyo, Japan
[73] Assignee: Sony Corporation, Tokyo, Japan
[21] Appl. No.: 663,064
[22] Filed: Oct. 17, 1984
[30] Foreign Application Priority Data Oct. 17, 1983 [JP] Japan .................................. 58-193675

[51] Int. Cl.$^4$ ................................................ G09B 5/04
[52] U.S. Cl. .................................... 434/311; 434/327; 434/335
[58] Field of Search ............... 434/308, 309, 311, 335, 434/327

[56] References Cited

U.S. PATENT DOCUMENTS

| 3,696,525 | 10/1972 | Cleary | 434/311 |
| 3,981,087 | 9/1976 | Sachs | 434/308 |
| 4,358,273 | 11/1982 | Yamamoto | 434/335 |
| 4,403,965 | 9/1983 | Hawkins | 434/327 |

*Primary Examiner*—Leo P. Picard
*Attorney, Agent, or Firm*—Lewis H. Eslinger; Alvin Sinderbrand

[57] ABSTRACT

A teaching machine is used with a card to pose a question to a user of the machine and to accommodate both a first case wherein a voice signal is audibly reproduced before the user enters his answer to the question into the machine and a second case wherein a voice signal is audibly reproduced after the user enters his answer into the machine. The machine includes a signal reproducer that cooperates with a card upon which a control signal, a correct-answer signal encoding a correct answer to the question and a voice signal are recorded and that reproduces the recorded signals from the card. A user of the machine enters a test answer to the question into the machine via a keyboard. A first memory responds to the correct-answer signal as reproduced by the signal reproducer for storing the correct answer, and a second memory responds to the keyboard for storing the test answer. A comparator responds jointly to the first and second memories for comparing the correct answer and the test answer and producing an output signal in accordance with the comparison. Lamps responsive to the comparator output signal indicate whether or not the test answer is correct. An audio channel jointly responsive to the control signal and the voice signal as reproduced by the signal reproducer audibly reproduces the voice signal before making the comparison in the first case and after making the comparison in the second case.

6 Claims, 9 Drawing Figures

TEACHING MACHINE

BACKGROUND OF THE INVENTION

1. Field of the Invention

This invention relates to teaching machines and, more particularly, to a novel and highly-effective teaching machine that is especially adapted for the instruction of very young children and that cooperates successively with a multiplicity of instructional cards in such a manner as to function in a variety of modes.

2. Description of the Prior Art

Among the advantages of teaching machines are that they normally interact directly and individually with each student, thereby effectively constituting each student as a class of one; their patience with students employing them is unlimited, regardless of the abilities of the students, so that each student can proceed at his own optimum pace, being neither held back by other members of a class nor subject to embarrassment when giving incorrect answers; instructional materials for a large number of users can be centrally prepared and carefully tested for accuracy and degree of difficulty; the cost of instruction using machines is often less than the cost of the same instruction by human teachers; and many students find instruction by machine an enjoyable and stimulating experience.

Because of the importance that machines have assumed and are increasingly assuming in teaching foreign languages and the like, a great deal of attention has been given to their improvement.

Various machines have been proposed that cooperate with a card having a magnetic stripe (sometimes called a magnetic card). Such a machine checks an answer to a question prerecorded on the card and posed by the card or machine with the correct answer prerecorded on the card. The machine then informs the student whether the answer given by the student is correct.

One such conventional machine cooperates with a card upon which a magnetic track is printed by a magnetic ink and a non-magnetic ink alternately along the length of the card in such a manner to encode answers to questions. Though the area thus printed can be reproduced to show a correct answer, other information, such as multiple choice questions, cannot be recorded on the track. Furthermore, before reproducing the card, the student can prematurely detect the correct answer, if he knows the code, by observing the luster of the surface on the area printed by the different inks.

Another conventional machine cooperates with a card which has a striped magnetic tape upon which a question and the student's answer are both continuously recorded. Such a machine requires a device for causing the machine to pause after reproducing each question, and manual operation by the student becomes complicated. Moreover, the style of the questions must be formalized if the answer signal is not recorded in accordance with a predetermined code.

All prior teaching machines have limited versatility and typically present questions and check answers in only one format, or in just a few formats each of which differs very little from the others.

OBJECTS AND SUMMARY OF THE INVENTION

An object of the invention is to remedy the shortcomings of prior teaching machines noted above and, more particularly, to provide a teaching machine capable of operating in a number of modes that vary significantly from one another in order to lend interest and variety to a course of instruction.

Another object of the invention is to provide such a machine that cooperates with a multiplicity of magnetic cards in a way that renders it more effective than prior machines for educational and teaching purposes.

Another object of the invention is to provide such a machine which is especially adapted to the needs and limitations of very young children and which very young children can operate.

Another object of the invention is to provide such a machine which automatically selects the timing for reproducing a voice signal prerecorded on a card.

The foregoing and other objects are obtained in a teaching machine adapted to be used in combination with a card in order to pose a question to a user of the machine and to accommodate both a first case wherein a voice signal is audibly reproduced before the user enters his answer to the question into the machine and a second case wherein a voice signal is audibly reproduced after the user enters his answer into the machine.

In accordance with one aspect of the invention, a machine comprises signal-reproducing means adapted to cooperate with a card and to reproduce therefrom a control signal, a correct-answer signal encoding a correct answer to the question, and a voice signal recorded on the card; entry means by which a user of the machine can enter therein a test answer to the question; first memory means responsive to the correct-answer signal as reproduced by the signal-reproducing means for storing the correct answer; second memory means responsive to the entry means for storing the test answer; comparator means jointly responsive to the first and second memory means for making a comparison between the correct answer and the test answer and for producing an output signal in accordance with the comparison; signaling means responsive to the comparator output signal for indicating to the user whether the test answer is correct; and audio means jointly responsive to the control signal and the voice signal as reproduced by the signal-reproducing means for audibly reproducing the voice signal before making the comparison in the first case and after making the comparison in the second case.

BRIEF DESCRIPTION OF THE DRAWINGS

A better understanding of the objects, features and advantages of the invention can be gained from a consideration of the following detailed description of a preferred embodiment thereof, in conjunction with the figures of the accompanying drawing, wherein.

DESCRIPTION OF A PREFERRED EMBODIMENT

Figure 1:
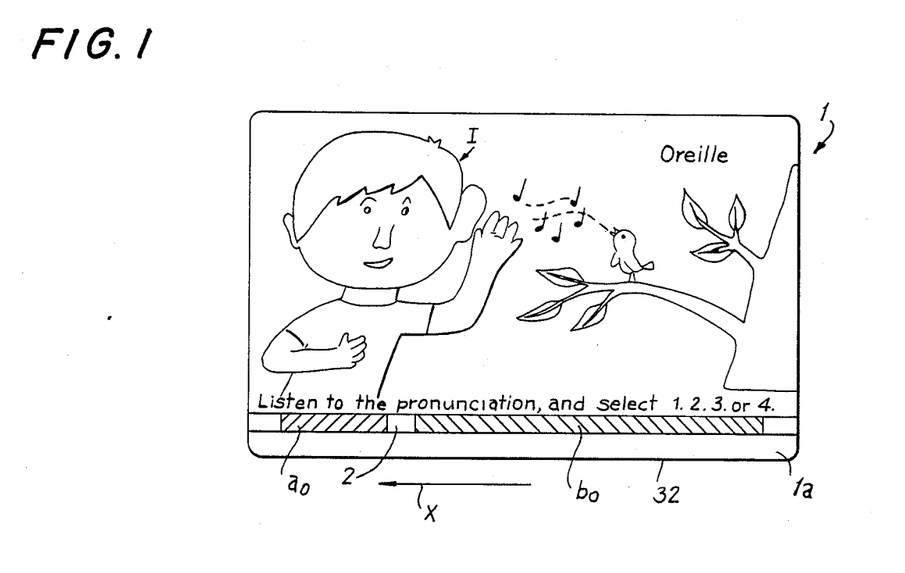
FIG. 1 is a plan view of a card for use in accordance with the invention.

FIG. 1 illustrates a card 1 which is employed with a machine M (FIG. 4) constructed in accordance with the invention. On a side 1a of the card 1, a magnetic medium 2, for example a magnetic tape affixed to the card 1, extends the length of the card 1. An arrow X shows the direction in which the card 1 is driven by the machine M.

At the beginning of the magnetic tape 2 (the left side thereof as shown in FIG. 1), coded signals $a_0$ are prerecorded; adjacent thereto, an audio voice signal $b_0$ is prerecorded. Since the card 1 and machine M are intended for the instruction of very young children, the card 1 may include an illustration I to lend interest.

Figure 2:
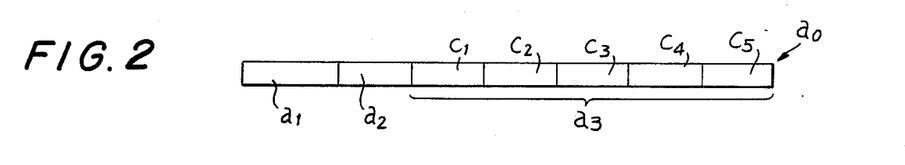
FIG. 2 is a plan view of a portion of a magnetic tape or stripe in which coded signals have been recorded in accordance with the invention.

As FIG. 2 shows, the coded signals $a_0$ contain three segments $a_1$, $a_2$, $a_3$. While the number of information bits in the singals $a_0$ can be varied, in a preferred embodiment of the invention the signals $a_0$ contain altogether 22 bits. The first signal segment $a_1$ is made up of four bits and is used to identify the existence and mark the beginning of the coded signals $a_0$. The second signal segment $a_2$ is made up of three bits and is used to show the selected mode in which the machine M is to be operated. There are preferably four such modes, as described below, though the number can be varied. The third signal segment $a_3$ is made up of five characters $C_1$, $C_2$, $C_3$, $C_4$ and $C_5$ of three bits each and is used to indicate to a student or other user of the machine the correct answer to a question posed by the machine when operated in accordance with the invention.

Figure 3:
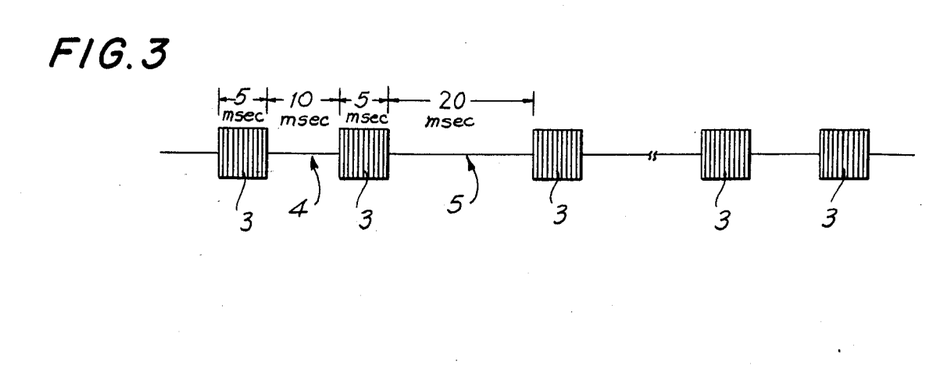
FIG. 3 is a schematic view of a recording pattern that can be used to record signals in accordance with the invention.

FIG. 3 shows a recording pattern for the coded signals $a_0$ on the magnetic tape 2 which is suitable for use in accordance with the invention. A mark signal 3, which has an audio frequency, such as 3 KHz, is intermittently recorded as a burst signal for 5 msec. The binary levels "1" and "0" are distinguished in accordance with the length of the blank interval 4 or 5 between an adjacent pair of mark signals 3, 3. If the blank interval, such as the interval 4, lasts for substantially 10 msec, the interval represents the binary level "0"; and if the blank interval, such as the interval 5, lasts for substantially 20 msec, the interval represents the binary level "1". These times (5 msec, 10 msec, and 20 msec) can be increased 100% or reduced 50% as described below to accommodate different operational speeds.

The first signal segment $a_1$ is always "1, 0, 1", and there is always a burst (normally of 5 msec duration) at the end of the signals $a_0$. The total time to reproduce the coded signals $a_0$ at standard operating speed is thus calculated as follows:

A. the minimum total time (when all of the bits of the second and third signal segments $a_2$ and $a_3$ represent the level "0") is $$355 \text{ msec} = 60 \text{ msec} + 18 \times 10 \text{ msec} + 23 \times 5 \text{ msec} \quad (1)$$

The first term on the right side of the equation represents the combined length of the intervals 4 and 5 of the initial "0, 1, 0, 1" of the signal segment $a_1$; the second side on the right term of the equation represents the number of intervals, each 10 msec in length, in the remaining bits in signal segments $a_1$ and $a_2$; and the third term on the right side of the equation represents the number of mark signals 3 (including the final one), each 5 msec long, in the signal segments $a_1$, $a_2$ and $a_3$.

B. the maximum total time (when all of the bits of the second and third signal segments $a_2$ and $a_3$ represent the level "1") is $$535 \text{ msec} = 60 \text{ msec} + 18 \times 20 \text{ msec} + 23 \times 5 \text{ msec} \quad (2)$$

The first and third terms and the first factor of the second term on the right side of equation (2) are identical to the corresponding terms and factor of equation (1). However, the second factor of the second term on the right side of equation (2) is 20 msec, which, as indicated above, is the length of an interval 5 corresponding to the binary level "1".

The second signal segment $a_2$, which is made up of three bits, can assume any one of $2^3 = 8$ states. It designates any one of the following four different modes of machine operation in accordance with four of those states:

Mode 1: After hearing the audio voice signal $b_0$, which by itself or in combination with an inscription on a card poses a question, the student or user of the machine enters an answer into the machine as described below. The machine then compares the student's answer with the correct answer in which a plurality of numerals are arranged in order. For example, the question may involve selecting words from a list of numbered words to fill in blanks in a foreign-language sentence written on the card. The student is required to select the numbers in proper sequence. The answer signal segment $a_3$ encodes numerals in the proper sequence, which the machine compares with the sequence of numerals entered by the student.

Mode 2: After hearing the audio voice signal $b_0$, which poses a question in multiple-choice format, the student enters his answer as in mode 1. The machine then compares the answer entered by the student with the correct answer prerecorded on the card. Since the format in this mode is multiple choice, the correct answer is represented by a single numeral. For example, the voice signal $b_0$ may pronounce the French word "oreille" ("ear") in four different ways, only one of which is correct, and require the user to select a numeral 1, 2, 3 or 4 corresponding to the correct pronunciation (see FIG. 1).

Mode 3: The question to be answered is printed on the card 1. Without hearing the audio voice signal $b_0$, the student enters his answer to the question. The machine then compares the student's answer with the correct answer, in which a plurality of numerals are arranged in order, as in mode 1, and also reproduces the audio voice signal $b_0$, by which the correct answer is explained.

Mode 4: The question to be answered is printed on the card, as in mode 3, but is in multiple-choice format. Without hearing the audio voice signal $b_0$, the student enters his answer to the question. The machine then compares the student's answer with the correct answer, as in mode 2, and also reproduces the audio voice signal $b_0$ by which the correct answer is explained.

Each card 1 for use with the machine bears a suitable inscription indicating how to operate the card and machine, as shown in FIG. 1. The student thus knows after reading the inscription on the card 1 how the question will be posed and when he should enter his answer thereto.

Figure 4:
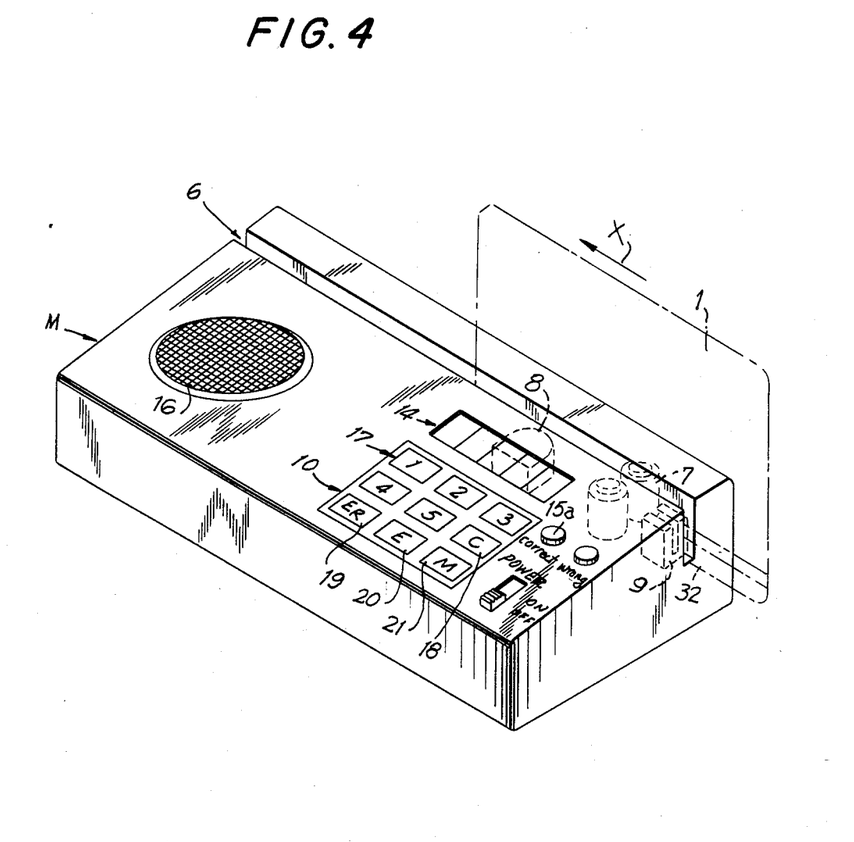
FIG. 4 is a perspective view of a preferred embodiment of a teaching machine constructed in accordance with the invention.

FIG. 4 shows the machine M for reproducing signals recorded on the card 1. The machine is formed with slot means such as a slot 6 which extends across the top of the machine and is adapted to receive the card 1 with its bottom edge 32 resting against the bottom of the slot 6 as shown by dotted lines. When the card 1 is properly inserted into the machine M as described below, a drive means such as pinch rollers 7 drives the card in the direction of the arrow X. Signal-reproducing means such as a magnetic reproducing head 8 reproduces the signals recorded on the magnetic portion 2 of the card 1. Detecting means such as a sensor 9 detects insertion of the card 1 into the slot 6. Components 9, 7 and 8 are all mounted in the machine for successive cooperation with the card 1 as it advances along the slot 6. When the detector 9 detects the insertion of the card 1 in the slot 6, the pinch rollers 7 begin to rotate. If the card 1 is then pushed into engagement with the rollers 7, the card 1 is driven by the rollers 7 in the direction of the arrow X.

The coded signals $a_0$ and the audio voice signal $b_0$ can also be sequentially reproduced by manually pushing the card 1 through the slot 6 in the direction of the arrow X. Because the third signal segment $a_3$, which contains the correct answer, is reproduced prior to the audio video voice signal $b_0$, the question-and-answer format is flexible: for example, the student can enter his answer into the machine before (modes 3 and 4) or after (modes 1 and 2) the audible reproduction of the voice signal $b_0$. The machine is instructed as to the proper mode of operation by the signal segment $a_2$. Accordingly, many cards which present questions and answers in different ways can be used with the machine M.

The machine M includes a keyboard 10 that has five answer buttons 17 respectively having numerals 1 to 5 inscribed on their tops, and a clear button 18 for clearing a previous answer so that a different answer can be entered instead. The number of answer buttons 17 can of course be increased to accommodate more complicated questions, as those skilled in the art will readily understand. This calls for a corresponding increase in the number of characters $C_1$ to $C_5$ in signal segment $a_3$. If the number of answer buttons exceeds 8, the number of bits per character must be increased beyond three, since three bits can specify only $2^3=8$ different numbers.

The keyboard 10 also has an erase button 19 for resetting a counter and memory devices which are described below; an enter button 20 which is depressed in order to enter a number designated by one of the answer buttons 17 into the machine; and a mark or grade button 21 which is pushed in order to display the result of a calculation representing the record of correct answers which have been made since power to the machine was turned ON or the erase button was last pushed.

The machine M includes a display device 14 that can display up to five digits simultaneously. The number of digits in the display can of course be increased in order to increase the capacity of the machine, as those skilled in the art will readily understand. The device 14 is used to display the numerals in the order in which they were entered into the machine M by the student in response to a question. A lamp 15a lights to show that an answer entered into the machine by the student is correct, and another lamp 15b lights to indicate a wrong answer. A loudspeaker 16 is mounted in the machine to reproduce the voice signal $b_0$ audibly.

Figure 5:
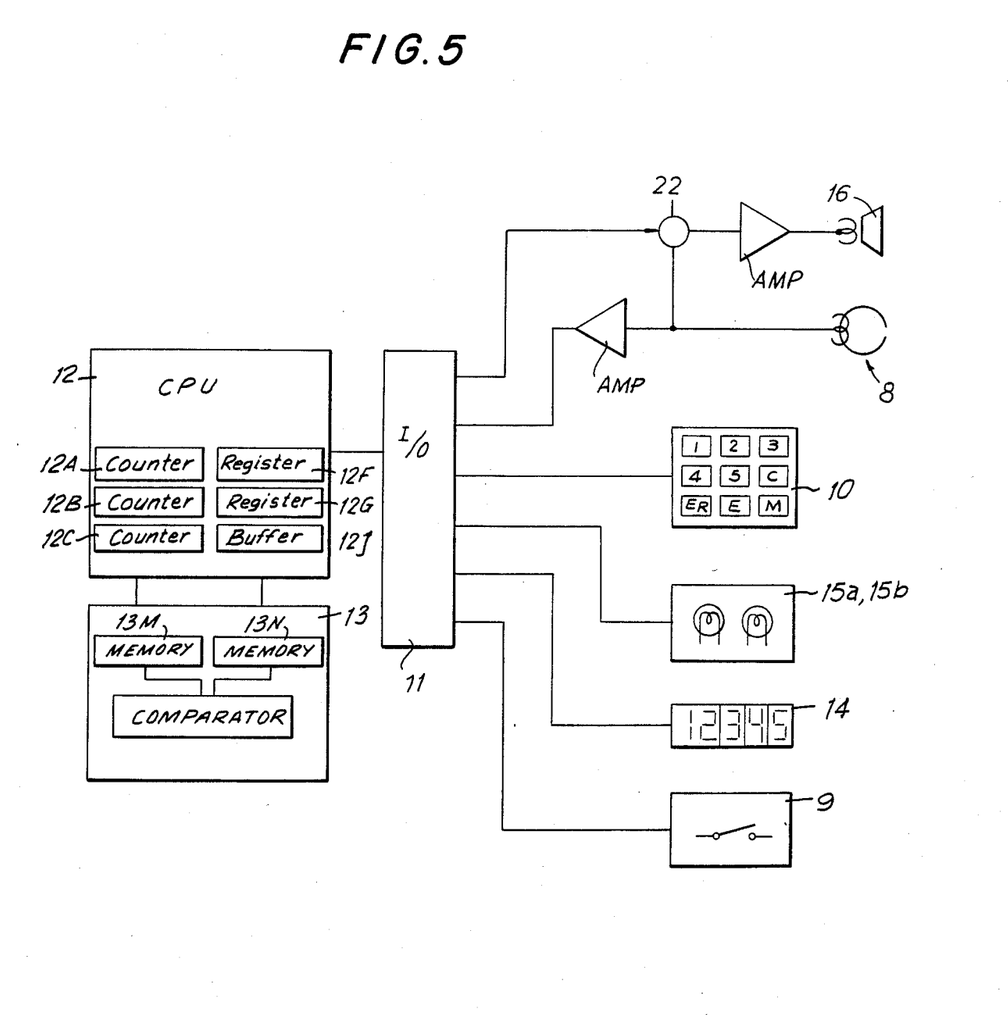
FIG. 5 is a block diagram of the machine of FIG. 4.

FIG. 5 is a block diagram of a preferred embodiment of the machine M. Instructions from the clear, erase, enter and mark buttons 18, 19, 20 and 21, the numerals selected by the buttons 17, the coded signals $a_0$ reproduced by the head 8, and a detection signal generated by the detecting device 9 are transferred through an input and output (I/O) control circuit 11 to a microcomputer (CPU) 12. The microcomputer 12 performs a number of functions, including determining, in conjunction with a memory 13 described below, whether or not an answer entered by the student is correct and calculating the number of correct answers. As a result of the operation of the microcomputer 12, the input and output control circuit 11 generates control signals for driving the display device 14 and the pair of lamps 15a, 15b and for controlling a muting circuit 22. The latter circuit mutes the loudspeaker 16 so that it does not audibly reproduce certain of the coded signals $a_0$ reproduced by the head 8 and transmitted to the loudspeaker 16 (the signals $a_0$ encode certain instructions to the machine which are not intended for communication to the student).

When the detecting device 9 detects the card 1, electric power is supplied to amplifiers AMP, AMP in the audio circuit for preparing to reproduce the recorded signals $a_0$ and $b_0$.

Counter circuits 12A, 12B and 12C, register circuits 12F and 12G, and buffer circuits 12J are internally connected to the microcomputer 12. The counter 12A counts the total number of questions, in other words counts the cards fed into the machine M. The counter 12B counts the total number of correct answers made by the student. The counter 12C counts the total number of incorrect answers. The register circuits 12F and 12G are used for distinguishing the route followed in the flowchart shown in FIGS. 6A and 6B. The buffer circuit 12J is used for temporarily storing the data entered by means of the answer buttons 17. The memory device 13 comprises two memory circuits 13M and 13N. The circuit 13M is used for storing the coded signals $a_2$ and $a_3$ reproduced by the magnetic head 8 from the magnetic tape 2. The circuit 13N stores the data entered by means of the answer buttons 17 through the buffer circuit 12J.

Figure 6A:
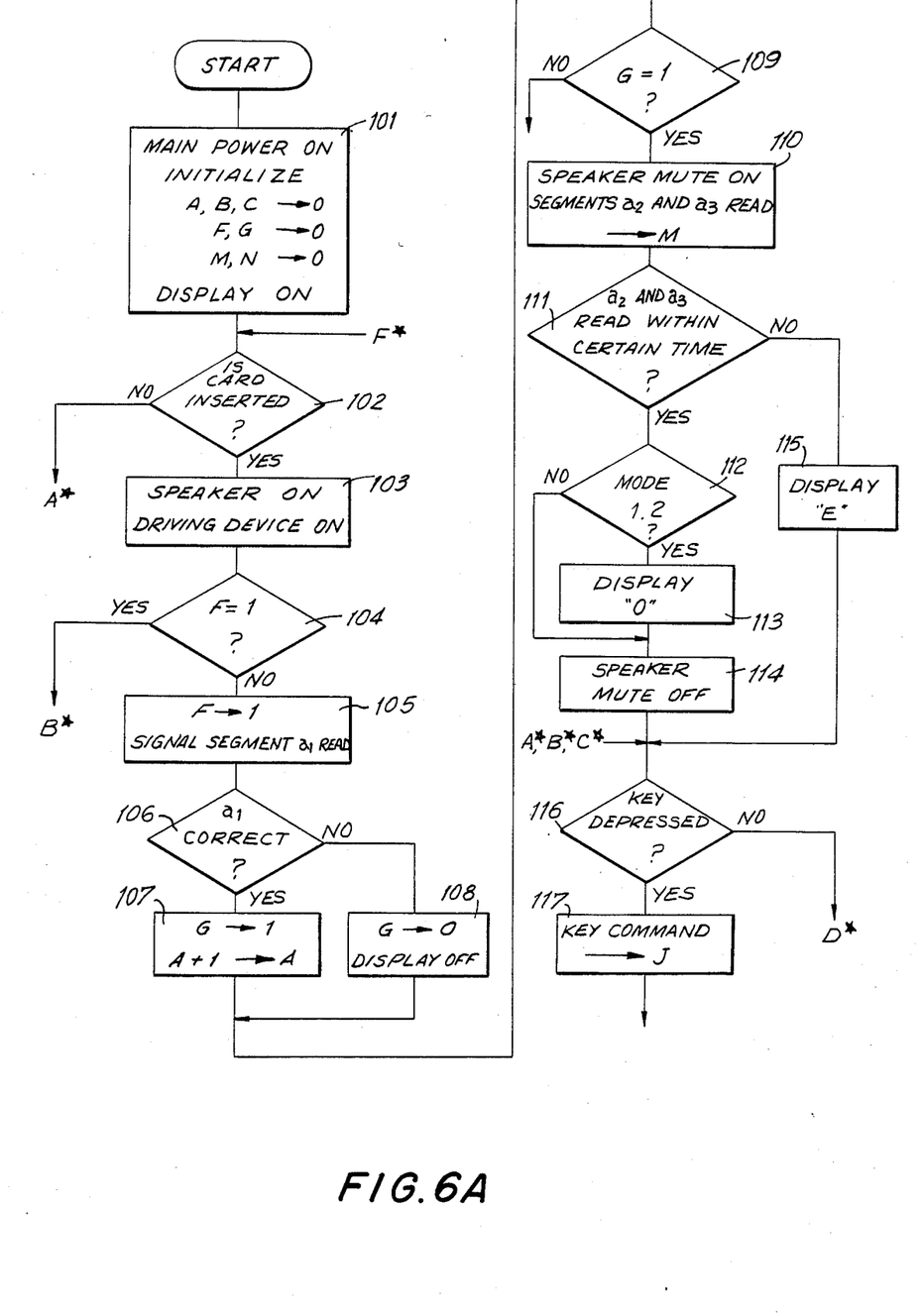
FIGS. 6A and 6B are a flow chart showing the operation of the machine of FIGS. 4 and 5.
Figure 6B:
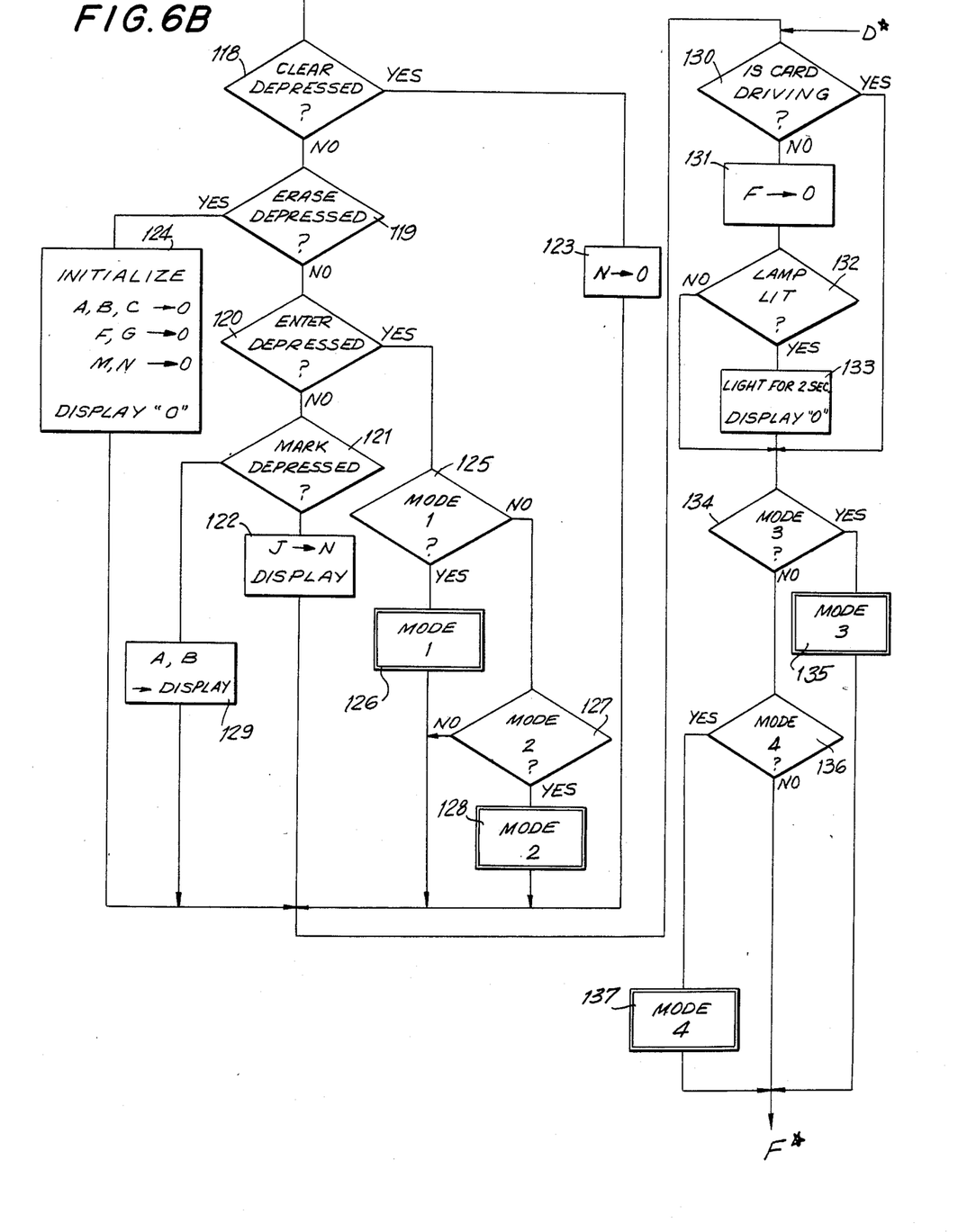

FIGS. 6A and 6B show the operation of the machine M in its several modes.

As indicated at 101 in FIG. 6A, when the main power switch is turned ON, all of the counter circuits 12A, 12B, 12C, register circuits 12F, 12G and memory circuits 13M, 13N are initialized by being reset or cleared to "0". The display device displays "0".

As indicated at 102, the detecting device 9 investigates whether or not a card 1 has been inserted into the slot 6. If no detection signal is generated by the detecting device 9 (FIGS. 4 and 5), in other words if a card 1 has not been inserted into the slot 6, the program executes a jump A to box 116 discussed below.

If it determined as a result of the investigation at 102 that a card 1 has been inserted into the slot 6, the program advances to the portion thereof shown at 103, and the driving device 7 and loudspeaker 16 are energized in preparation for reproducing the recorded signals on the card 1.

The program then advances to the portion thereof indicated at 104, where the register circuit 12F is investigated to determine whether or not it stores a "1". If the register circuit 12F already stores a "1", the program executes jump B to the portion thereof indicated at 116 and discussed below.

If the investigation made at 104 reveals that the register 12F does not store "1", the program advances to the portion thereof represented at 105, and the reproducing head 8 prepares to reproduce the recorded signals. To this end, the data stored in register circuit 12F is changed to "1". To signal the difference between conventional magnetic cards, which have no coded signals $a_0$, and the card 1, which has coded signals $a_0$, the signal segment $a_1$ is located at the beginning of the signals $a_0$ (in the preferred embodiment, at the left end as viewed from the perspective of FIG. 1). The signal segment $a_1$ is thus the first segment of the signals $a_0$ to be reproduced.

The program then advances to the portion thereof indicated at 106, where the first signal segment $a_1$ reproduced from the card 1 is investigated to determine whether or not it is correct. This is done by comparing the signal segment $a_1$ with the predetermined, permanently-stored binary train "0, 1, 0, 1". As part of the comparison, the microprocessor 12 measures the length of the blank intervals 4 and 5 (FIG. 3), which respectively correspond to levels "0" and "1".

If at 106 the correct first coded signal segment $a_1$ is detected, the program advances to the portion thereof indicated at 107. The data stored in the register circuit 12G is then changed to "1", and the total count of counter circuit 12A is increased by 1 at the same time.

If at 106 the first signal segment $a_1$ is not detected (which may occur because the signal segment $a_1$ is not properly recorded on the card 1 or because the card 1 is not advanced towards the driving circuit 7 even though the card 1 is inserted into the slot 6), the data stored in the register circuit 12G is changed to "0", and the display device 14 is turned OFF.

Following the program step indicated at 107 or 108, the program advances to the portion thereof indicated at 109, where the register circuit 12G is investigated to determine whether it stores "1" or "0". When the register 12G stores "0", the program executes a jump C to the portion thereof indicated at 116 and discussed below.

If the investigation made at 109 reveals that the register circuit 12G stores "1", the program advances to the portion thereof indicated at 110, and a muting circuit 22 shown in FIG. 5 is actuated for muting the reproduced signals $a_0$ which are transmitted to the loudspeaker 16, and the second and third signal segments $a_2$ and $a_3$ are detected and stored in the memory M at intervals which are predetermined when the first signal segment $a_1$ is detected.

The functions performed at 110 provide a number of advantages. For example, if for the student's convenience the driving speed for card 1 becomes slower or faster within a range of $+100\%$ or $-50\%$, the second and third signal segments $a_2$ and $a_3$ are precisely detected by previously measuring the intervals 4 and 5 (FIG. 3) in the first signal segment $a_1$. The signal segment $a_1$ is reproduced at substantially the same slower or faster driving speed as the signal segments $a_2$ and $a_3$.

While the intervals 4 and 5 in the signal segment $a_0$ are normally 10 msec and 20 msec, respectively, they can vary within a range of $+100\%$ and $-50\%$ and in such cases are taken as measures of the levels "0" and "1", respectively. Moreover, by means of the muting circuit 22, the generation of unpleasant or distracting sounds by the loudspeaker 16 during reproduction of the second and third signal segments $a_2$ and $a_3$ is avoided.

After performing the steps indicated at 110, the program advances to the portion thereof indicated at 111.

The second and third signal segments $a_2$ and $a_3$ are investigated to determine whether they are detected without any error and whether their combined duration is within the range as calculated in equations (1) and (2) above. This range is adjusted if required by an increased or reduced card transport speed determined by measuring the intervals 4 and 5 in signal segment $a_1$, as described above.

If it is determined as a result of the investigation made at 111 that the second and third signal segments $a_2$ and $a_3$ are precisely reproduced, the second signal $a_2$, which is now stored in the memory circuit M, is investigated to determine which mode it shows. If the signal segment $a_2$ shows either mode 3 or mode 4 (i.e., if it fails to show mode 1 or 2), the program executes a jump to the portion thereof indicated at 114.

If as a result of the investigation of the second signal segment $a_2$ made at 112 it is determined that mode 1 or mode 2 is designated, the program advances to the portion thereof shown at 113, and the display 14 displays "0".

The program then advances to the portion thereof shown at 114. Then, at a predetermined time after the muting circuit 22 is turned ON (see the portion of the flow chart indicated at 110), the circuit 22 is turned OFF in preparation for transfer of the reproduced voice signal $b_0$ to the loudspeaker 16.

If at the portion of the flow chart indicated at 111 the second or third signal segment $a_2$ or $a_3$ is not precisely reproduced, for example if one of the binary signals is accidentally dropped out, the display device 14 displays "E" to inform the student of the error.

After performing the functions associated with the portion of the flowchart indicated at 114 or 115, or after executing any of the program jumps A, B or C, the program causes an investigation to be made at 116 to determine whether or not one of the buttons 17–21 in the keyboard 10 (FIGS. 4 and 5) is depressed. If none of the buttons 17–21 is depressed, the program executes a jump D to the portion thereof indicated at 130 (FIG. 6B).

If as a result of the investigation made at 116 it is determined that one of the buttons 17–21 is depressed, the command or numeral corresponding to the depressed button is temporarily stored in the buffer circuit 12J.

At 118 (FIG. 6B) the data stored in the buffer circuit 12J in the previous step is investigated to determine whether or not it is based on the depression of the clear button 18.

If the investigation made in the preceding step reveals that the data stored in the buffer circuit 12J is not based on depression of the clear button 18, the program advances to the portion thereof indicated 119, where a determination is made whether or not the data stored in the buffer circuit 12J is based on depression of the erase button 19.

If the investigation made in the preceding step reveals that the data stored in the buffer circuit 12J is not based on depression of the erase button 19, the program advances to the portion thereof indicated 121, where a determination is made whether or not the data stored in the buffer circuit 12J is based on depression of the enter button 20.

If the investigation made in the preceding step reveals that the data stored in the buffer circuit 12J is not based on depression of the enter button 20, the program advances to the portion thereof indicated 121, where a determination is made whether or not the data stored in the buffer circuit 12J is based on depression of the mark button 21.

If the investigation made in the preceding step reveals that the data stored in the buffer circuit 12J is not based on depression of the mark button 21, it has been determined by process of elimination that the data stored in the buffer circuit 12J is based on depression of one or more of the answer buttons 17. At the portion of the program indicated at 122, therefore, the data is transferred to the memory circuit 13N to memorize the data as the answer made by the student, and the display device 14 displays one or more numerals corresponding to the student's answer.

If at the portion of the program represented at 118 (FIG. 6B) it is determined that the data stored in the buffer circuit 12J is based on depression of the clear button 18, the program advances from the portion thereof indicated at 118 to the portion thereof indicated at 123, and the memory circuit 13N (FIG. 5) is reset to "0".

If at the portion of the program represented at 119 it is determined that the data stored in the buffer circuit 12J is based on depression of the erase button 19, the program advances from the portion thereof indicated at 119 to the portion thereof indicated at 124, and all of the counter circuits 12A, 12B, 12C, register circuits 12F, 12G, and memory circuits 13M, 13N are initialized, in other words reset or cleared to "0". The display device 14 accordingly displays "0". All of the operations in this step are the same as in the portion of the program indicated at 101.

If at the portion of the program represented at 120 it is determined that the data stored in the buffer circuit 12J is based on depression of the enter button 20, the program advances from the portion thereof indicated at 120 to the portion thereof indicated at 125, and a determination is made whether or not the second signal segment $a_2$ indicates mode 1.

If the investigation made in the preceding step reveals that signal segment $a_2$ shows mode 1, the program advances to the portion shown at 126 and a marking operation corresponding to mode 1 is performed, which is described below in connection with FIG. 7A.

If the investigation made in the portion of the program indicated at 125 reveals that the second signal segment $a_2$ does not indicate mode 1, the program advances to the portion thereof indicated at 127, where a determination is made whether or not the second signal segment $a_2$ indicates mode 2.

If the investigation made in the preceding step reveals that the second signal segment $a_2$ indicates mode 2, a marking operation corresponding to mode 2 is performed, which is described below in connection with FIG. 7A.

If the investigation made at the portion of the program indicated at 121 indicates that the data stored in the buffer circuit 12J is based on depression of the mark button 21, the total counts respectively accumulated by the counter circuits 12A and 12B are separately displayed in the display device 14, as indicated at 129.

After completion of the functions called for at 122, 123, 124, 126, 128 or 129 (FIG. 6B), or upon execution of program jump D following a negative determination at 116 (FIG. 6A), the program advances to the portion thereof indicated at 130, where an investigation is made of the data stored in the register circuits 12F and 12G and the detecting signal generated by the detecting device 9, to determine whether or not the card 1 is advancing. If the card 1 is advancing, the program executes a jump to the portion thereof indicated at 134.

If the investigation made in the previous step reveals that the card 1 is not advancing, the program advances to the portion thereof indicated at 131, and the data stored in the register circuit 12F is changed to "0".

The program then advances to the portion thereof indicated at 132, where an investigation is made to determine whether or not one of the lamps 15a and 15b (FIGS. 4 and 5) is lit. If the investigation reveals that neither lamp is lit, the program executes a jump to the portion thereof indicated at 134.

If the investigation at 132 reveals that one of the lamps 15a and 15b is lit, the program advances to the portion thereof indicated at 133, where the program ensures that the appropriate lamp 15a or 15b remains continuously in that condition for two seconds and that the display 14 displays "0".

Following step 133, an affirmative determination at 130, or a negative determination at 132, the program advances to the portion thereof indicated at 134, where an investigation is made of the second coded signal segment $a_2$ stored in the memory circuit 13M to determine whether or not it indicates mode 3.

If the investigation at 134 reveals that the memory circuit 13 M indicates mode 3, the program advances to the portion thereof indicated at 135, and a marking operation corresponding to mode 3 is performed, which is described in connection with FIG. 7B.

If the investigation made 134 reveals that the second coded signal segment $a_2$ fails to show mode 3, the program advances to the portion thereof shown at 136, where an investigation is made to determine whether or not the second coded signal segment $a_2$ indicates mode 4. If this investigation reveals that the second coded signal segment $a_2$ fails to show mode 4, the program executes a jump F back to the portion thereof indicated at 102 (FIG. 6A).

If the investigation made 136 reveals that the second coded signal segment $a_2$ indicates mode 4, the program advances to the portion thereof shown at 137, and a marking operation corresponding to mode 4 is performed, which is described below in connection with FIG. 7B.

Figure 7A:
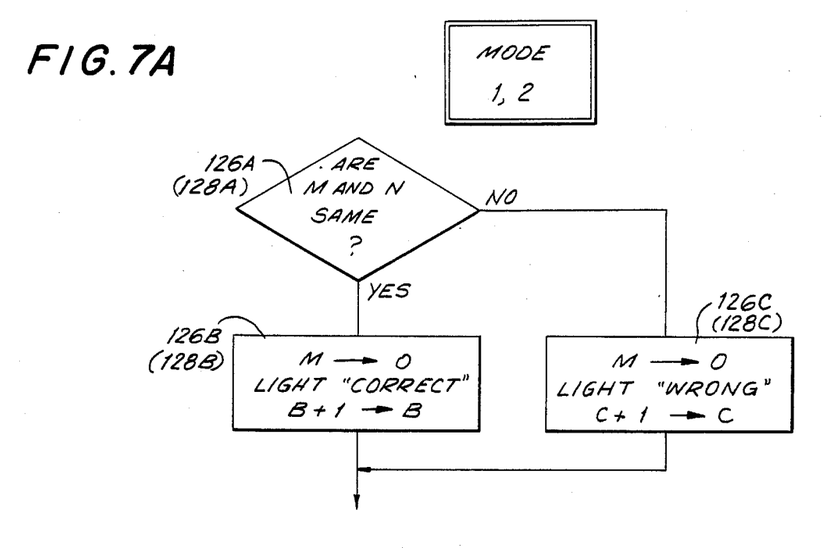
FIGS. 7A and 7B are flow charts respectively showing the operation of the machine in different modes.
Figure 7B:
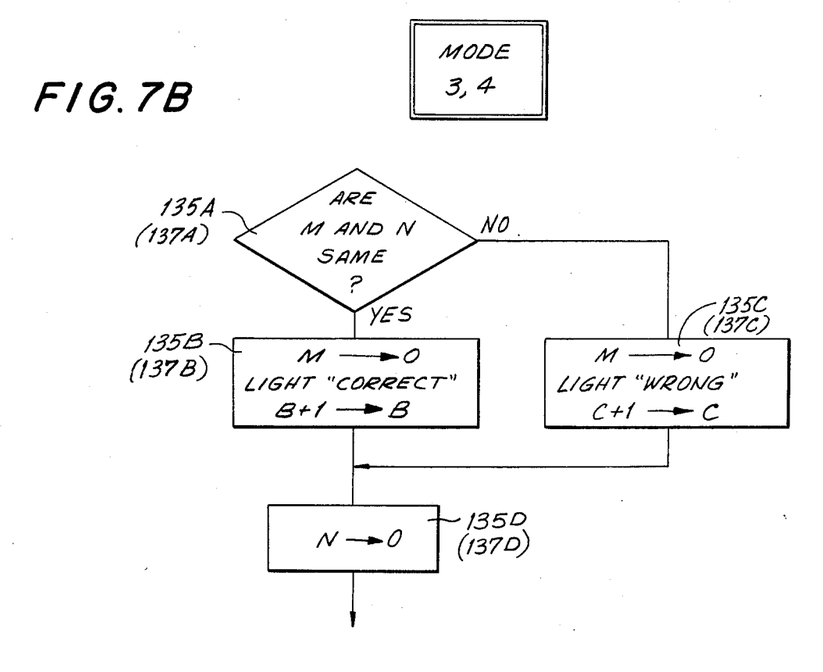

FIGS. 7A and 7B illustrate marking operations for modes 1 and 2 and for modes 3 and 4, respectively.

The data entered by the answer buttons 17 and stored in the memory circuit 13N are compared with the third coded signal segment $a_3$ which is stored in the memory circuit 13M. In a marking operation corresponding to mode 1, illustrated at 126A in FIG. 7A, the data in registers 13M and 13N are compared in order. In a marking operation corresponding to mode 2, illustrated at 128A in FIG. 7A, the registers 13M and 13N contain only one numeral each, which are compared.

As a result of either step 126A or 128A, if the answer entered by the student is found to be correct, i.e., if the data in the memory circuits 13M and 13N match, the program advances to the portion thereof shown at 126B or 128B, as the case may be, the memory circuit 13M is cleared to "0", the lamp 15a is lit, and the counter circuit 12B increases its count by one.

If as a result of either step 126A or 128A, the answer entered by the student is found to be incorrect, i.e., if the data in the memory circuits 13M and 13N do not match, the program advances to the portion thereof shown at 126C or 128C, as the case may be, the memory circuit 13M is cleared to "0", the lamp 15b is lit, and the counter circuit 15C increases its count by one.

In a marking operation corresponding to mode 3, illustrated at 135A in FIG. 7B, the data in registers 13M and 13N are compared in order. In a marking operation corresponding to mode 4, illustrated at 137A in FIG. 7B, the register 13M and 13N contain only one numeral each, which are compared.

As a result of either step 135A or 137A, if the answer entered by the student is found to be correct, i.e., if the data in the memory circuits 13M and 13N match, the program advances to the portion thereof shown at 135B or 137B, as the case may be, the memory circuit 13M is cleared to "0", the lamp 15a is lit, and the counter circuit 12B increases its count by one.

If as a result of either step 135A or 137A, the answer entered by the student is found to be incorrect, i.e., if the data in the memory circuits do not match, the program advances to the portion thereof shown at 135C or 137C, as the case may be, the memory circuit 13M is cleared to "0", the lamp 15b is lit, and the counter circuit 12C increases its count by one.

After completion of any of steps 135B, 137B, 135C and 137C, the program advances to the portion thereof indicated at 135D or 137D, as the case may be, wherein the memory circuit 13N is cleared to "0".

OPERATION SUMMARY

It is apparent from the preceding disclosure that, when power to the machine M is turned ON, as indicated at 101 in FIG. 6A, the machine operates in a loop 102, 116, 130 (FIG. 6B), 131, 132, 134, 136 and back to 102 (FIG. 6A).

When a card 1 (FIGS. 1 and 4) is properly inserted in the slot 6 (FIG. 4), the machine M operates in a loop 102 (FIG. 6A), 103, 104, 105, 106, 108, 109, 116, 130 (FIG. 6B), 131, 132, 134, 136 and back to 102 (FIG. 6A).

In mode 3 or 4, where the question to be answered is inscribed on the card 1 and the student enters his answer to the question into the machine M before the card 1 advances through the machine, the machine cycles once through the loop 102.(FIG. 6A), 103, 104, 105, 106, 108, 109, 116, 117, 118 (FIG. 6B), 119, 120, 121, 122, 130, 131, 132, 134, 136 and back to 102 (FIG. 6A). The machine then continues to operating the same loop, except that the program executes a jump from step 116 to step 130, then advances to 131, 132, etc., and steps 117, 118 (FIG. 6B), 119, 120, 121, and 122 are omitted.

Once the card 1 begins to advance in the slot 6, the program upon reaching step 106 (FIG. 6A) proceeds to step 107.

In modes 1 and 2, the program then executes steps 109, 110, 111, 112, 113, 114, 116 and 130 (FIG. 6B). On its first arrival at step 130, the program executes steps 134, 136, 102 (FIG. 6A), 103, 104 and 116, and then loops back to arrive at step 130 (FIG. 6B) a second time.

The program then executes steps 131, 132, 134, 136, 102 (FIG. 6A) and 116, and then loops back to arrive at step 130 (FIG. 6B) a third time.

The program then executes steps 131, 132, 134, 136, 102 (FIG. 6A), 116, 117, 118 (FIG. 6B), 119, 120, 121 and 122, and then loops back to arrive at step 130 a fourth time.

The program then executes the same steps as in the preceding paragraph as far as step 120 (FIG. 6B). It then executes step 125 and either step 126 or steps 127 and 128, then loops back to arrive at step 130 a fifth time.

The program then executes steps 131, 132, 133, 134, and 136, and then loops back to step 102 (FIG. 6A) in preparation for insertion of the next card.

In modes 3 and 4, after advancing from step 106 (FIG. 6A) to step 107, the program executes steps 107, 109, 111 and 112 in sequence. It bypasses step 113 and executes steps 114, 116, 130 (FIG. 6B) and 134. It then executes either step 135 or steps 136 and 137. It then executes steps 102 (FIG. 6A), 103, 104, and 116 and loops back to step 130 (FIG. 6B). It then executes steps 131, 132, 133, 134, and 136, and then finally loops back to step 102 (FIG. 6A) in preparation for insertion of the next card.

Thus there is provided in accordance with the invention a novel and highly-effective teaching machine that is especially adapted for the instruction of young children and that cooperates successively with a multiplicity of instructional cards in such a manner as to function in a variety of modes. Many modifications of the preferred embodiment of the invention disclosed herein will readily occur to those skilled in the art upon consideration of this disclosure. For example, the number of numerals in an answer can be increased up to 8 by making appropriate adjustments in the keyboard, display and memory circuits, number of characters in the signal segment $a_3$, etc., but without increasing the number of bits in signal segment $a_3$, or beyond 8 by increasing the number of such bits; and the details of the detector 9, drive means 7 and reproducing head 8 can be varied without departing from the spirit and scope of the invention. Accordingly, the invention is to be construed as including all embodiments thereof which are within the scope of the appended claims.

What is claimed is:

1. A teaching machine adapted to pose a question to a user of the machine and to accommodate both a first case wherein a voice signal is audibly reproduced before the entry into the machine of the user's answer to the question and a second case wherein a voice signal is audibly reproduced after the entry into the machine of the user's answer, said machine comprising:

a card formed with a single magnetic track, there being a control signal, a correct-answer signal encoding a correct answer to said question, and a voice signal recorded in series on said single magnetic track;

signal reproducing means adapted for movement relative to said card and for sequential reproduction first of said control signal and then of the remaining ones of said recorded signal and then of the remaining ones of said recorded signals in response to said relative movement, at least said control signal being formed of a plurality of bits capable of distinguishing at least said first and second cases;

entry means by which a user of the machine can enter into said machine a test answer to said question;

first memory means responsive to said correct-answer signal as reproduced by said signal-reproducing means for storing said correct answer;

second memory means responive to said entry means for storing said test answer;

comparator means jointly responsive to said first and second memory means for making a comparison between said correct answer and said test answer and for producing an output signal in accordance with said comparison;

signaling means responsive to said comparator output signal for indicating to said user whether said test answer is correct; and audio means controlled by said control signal so that said audio means audibly reproduces said voice signal before making said comparison in said first case and after making said comparison in said second case.

2. A machine according to claim 1; further comprising drive means engageable with said card for driving said card into operative association with said signal-reproducing means.

3. A machine according to claim 1; wherein said signal-reproducing means comprises a magnetic head adapted to scan said single magnetic track.

4. A machine according to claim 1; wherein said control signal comprises a first segment which signals the existence of said recorded signals and a second segment which distinguishes between said first case and said second case; and wherein said signal-reproducing means reproduces said first and second segments, said correct-answer signal and said voice signal in that order.

5. A machine according to claim 4; further comprising slot means for insertion of said card therein, detection means for generating a detection signal in response to said insertion, and drive means responsive to said detection signal for driving said card into operative association with said signal-reproducing means; and wherein said audio means includes a loudspeaker, means responsive to said detection signal for energizing said loudspeaker, and means responsive to reproduction of said first segment by said signal-reproducing means for muting said loudspeaker, whereby said second segment and said correct-answer signal as reproduced by said signal-reproducing means remain inaudible to said user.

6. A machine according to claim 1; wherein said correct answer signal includes a segment containing plurality of characters capable of encoding a plurality of choices in a designated sequence.

* * * * *